No. 756,937. PATENTED APR. 12, 1904.
N. E. CHURCH.
SYNCHRONIZING DEVICE.
APPLICATION FILED SEPT. 27, 1902.
NO MODEL.
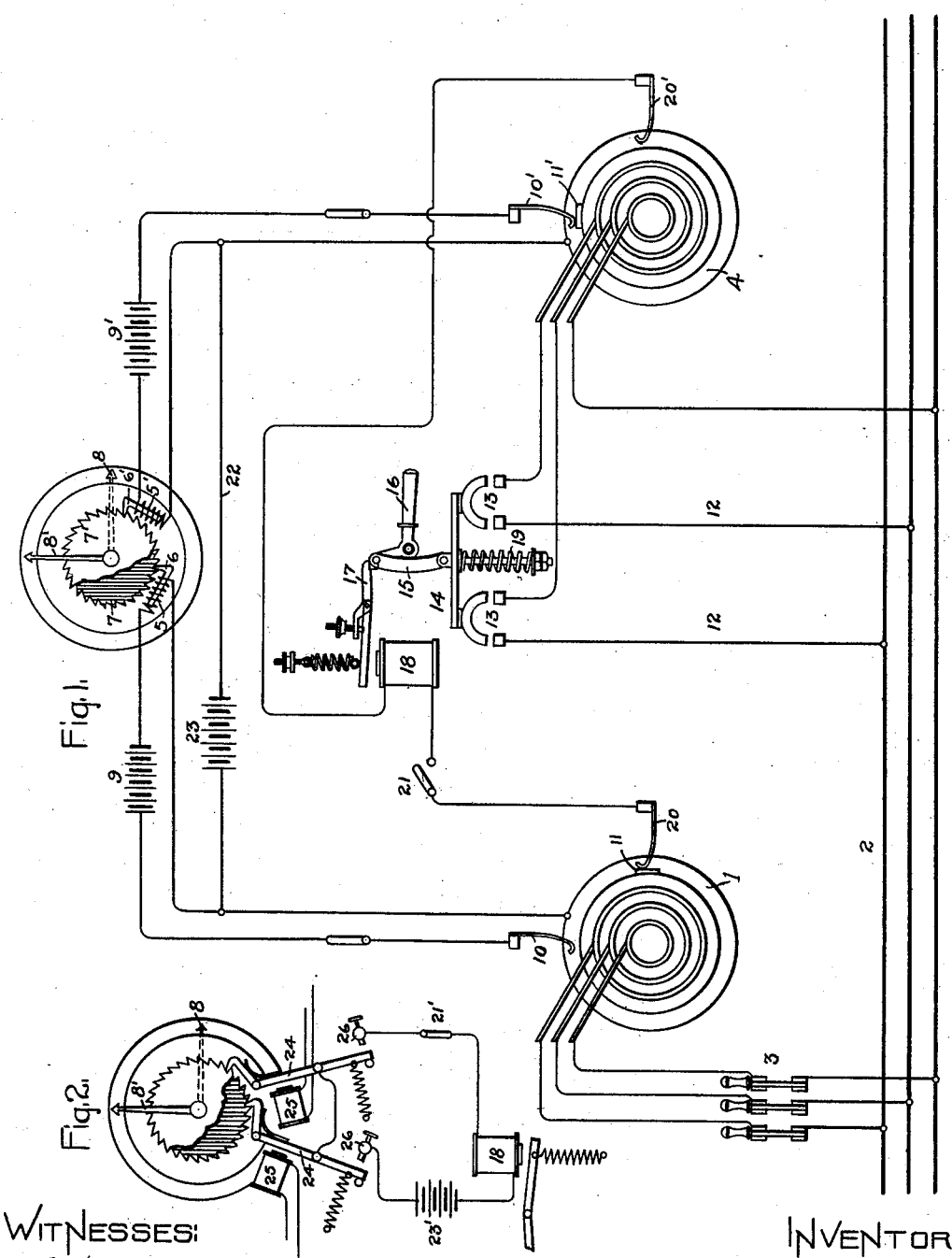
WITNESSES:
INVENTOR:
Nathan E. Church.
by
Atty.

No. 756,937. Patented April 12, 1904.

UNITED STATES PATENT OFFICE.

NATHAN E. CHURCH, OF SCHENECTADY, NEW YORK, ASSIGNOR TO GENERAL ELECTRIC COMPANY, A CORPORATION OF NEW YORK.

SYNCHRONIZING DEVICE.

SPECIFICATION forming part of Letters Patent No. 756,937, dated April 12, 1904.

Application filed September 27, 1902. Serial No. 125,026. (No model.)

*To all whom it may concern:*

Be it known that I, NATHAN E. CHURCH, a citizen of the United States, residing at Schenectady, in the county of Schenectady, State of New York, have invented certain new and useful Improvements in Synchronizing Devices, of which the following is a specification.

This invention relates to alternating-current dynamo-electric machines; and its object is to provide a device for coupling in parallel two such machines. In order that the coupling may be safely effected, the two machines must have the same frequency and terminal voltage and must coincide in phase. Ordinarily the coupling is effected by hand, the attendant watching some kind of indicator until it shows that the two machines are nearly in step and then closing a hand-switch to connect the additional machine with the line. This requires considerable skill, and one purpose of my invention is to enable the coupling to be done safely by a less experienced person.

I provide each machine with a speed-indicator and group all the speed-indicators together for facility of observation. I also provide each additional machine with an automatic circuit-closer, which will operate only when that machine is in phase with the one already in circuit.

In the accompanying drawings, Figure 1 is a diagram illustrating my invention applied to two alternating-current generators, and Fig. 2 shows a modification.

The three-phase generator 1 is connected with the mains 2 by switches 3 and is supposed to be running at full speed. The additional triphase generator 4 is supposed to be coming up to speed; but two of its connections with the mains are open, so that the mains receive no current from the generator 4. Each machine drives a speed-indicator, preferably of the electric type and comprising a solenoid 5 5', whose core carries a pawl 6 6', engaging with a ratchet-wheel 7 7', on whose shaft is an index 8 8'. In circuit with the solenoid is a battery 9 9' and also a circuit-closer, actuated at a predetermined point or points in the rotation of the generator. The circuit-closer may comprise a stationary spring-contact 10 10', insulated from the frame of the machine, and a moving contact 11 11', mounted on a rotating part of the machine. The terminals of the solenoid-circuit are connected, respectively, with the insulated spring-contact and the frame of the machine, so that the circuit is closed once in each revolution. The index will thus be moved along step by step at a speed corresponding with that of the generator with which it is connected. By placing the two ratchet-wheels and their attached indices on a common axis the relative speeds of the two generators can be readily compared. When the speeds are the same, the two indices will maintain the same angular distance apart as they revolve.

In order to insure a coincidence of phase at the instant the two machines are coupled, I provide an electromagnetic circuit-closer for the leads 12 from the generator 4 and arrange a local circuit to energize said circuit-closer at the proper moment. The preferred arrangement is shown in Fig. 1, where the leads 12 each include a double-pole switch 13, the two movable contacts of said switches being carried on a cross-bar 14, which can be moved to open the switches by a toggle-link 15 and handle 16. The switches are locked open by a spring-latch 17, which can be tripped by an electromagnet 18, allowing a spring 19 to close the switches. The terminals of the electromagnet are connected with two spring-contacts 20 20', located symmetrically with reference to the rotating parts of the machines carrying the contacts 11 11'. Between one of the spring-contacts 20 20' and the electromagnet 18 is a hand-switch 21. The frames of the machine are connected by a conductor 22, in which a battery 23 is interpolated.

When the attendant sees by the indicators that the machines are running at about the same speed, he closes the switch 21, and as soon as both the contacts 11 11' pass the spring-contacts 20 20' at the same instant the circuit from the battery 23 will be closed through the electromagnet 18 and the switch 13 will close and connect the generator 4 with the mains.

In Fig. 2 the pawl-actuating armatures 24 of the two electromagnets 25 which operate the speed-indicators are arranged to close the circuit of the battery 23' at the two posts 26. When the two machines attain the same speed, the hand-switch 21' is closed, and the instant both magnets operate simultaneously, which will be only when the two machines are in phase, the electromagnetic switch will operate.

What I claim as new, and desire to secure by Letters Patent of the United States, is—

1. The combination with two alternating-current machines, of means for indicating to the attendant when the two machines are running at approximately the same speed, means for automatically coupling said machines in parallel whenever they coincide in phase, and a manually-operated device whereby the attendant can cause said coupling means to operate or not, at will.

2. The combination with two alternating-current machines, of an electromagnetic switch for connecting one of said machines to the line, circuit-closers controlled respectively by the two machines for energizing said switch when the machines are in phase, and a manually-operated device for permitting or preventing the operation of said circuit-closers, at will.

3. The combination with two alternating-current machines, of an electromagnetic switch for connecting one of said machines, said circuit-closers being controlled by the two machines respectively, and being closed thereby when the machines are at the same point of their rotation, and a manually-operated device controlling the circuit of said circuit-closers.

4. The combination with two alternating-current machines, of an electromagnetic switch for connecting one of said machines to the line, a hand-switch in circuit with the electromagnet, and two circuit-closers in series therewith, each controlled by one of said machines.

5. The combination with two alternating-current machines, of a speed-indicator for each machine, an electromagnetic switch for automatically connecting one of said machines to line when the two machines are in phase, and a hand-switch controlling said electromagnetic switch.

6. The combination with two alternating-current machines, of a speed-indicator for each machine, an electromagnetic switch for connecting one of said machines to the line, two circuit-closers controlled respectively by said machine for energizing said switch when the machines are in phase, and a hand-switch in series with the electromagnetic switch.

In witness whereof I have hereunto set my hand this 25th day of September, 1902.

NATHAN E. CHURCH.

Witnesses:
G. C. HOLLISTER,
HELEN ORFORD.